United States Patent
Stevens, Jr.

(10) Patent No.: US 7,425,916 B2
(45) Date of Patent: Sep. 16, 2008

(54) AIRBORNE DISTRIBUTED PULSE DOPPLER RADAR MISSILE WARNING SYSTEM

(76) Inventor: Robert R. Stevens, Jr., 9 Nevada Dr., Chelmsford, MA (US) 01824

( * ) Notice: Subject to any disclaimer, the term of this patent is extended or adjusted under 35 U.S.C. 154(b) by 182 days.

(21) Appl. No.: 11/599,500

(22) Filed: Nov. 14, 2006

(65) Prior Publication Data
US 2008/0111728 A1 May 15, 2008

(51) Int. Cl.
*G01S 7/38* (2006.01)
(52) U.S. Cl. ............................... 342/13; 342/14; 342/15
(58) Field of Classification Search ............. 342/13–19, 342/192, 196
See application file for complete search history.

(56) References Cited

U.S. PATENT DOCUMENTS

| | | | |
|---|---|---|---|
| 3,787,850 A | | 1/1974 | Sletten, et al. |
| 4,028,699 A | * | 6/1977 | Stevens ...................... 342/108 |
| 4,190,837 A | * | 2/1980 | Salvaudon et al. ............ 342/17 |
| 4,700,191 A | | 10/1987 | Manor |
| 4,707,697 A | * | 11/1987 | Coulter et al. ............ 342/25 A |
| 4,797,839 A | | 1/1989 | Powell |
| 5,061,930 A | * | 10/1991 | Nathanson et al. ............ 342/13 |
| 5,265,121 A | | 11/1993 | Stewart |
| 5,287,110 A | | 2/1994 | Tran |
| 5,406,286 A | | 4/1995 | Tran et al. |
| 5,410,313 A | | 4/1995 | Tran |
| 5,457,460 A | | 10/1995 | Tran |
| 5,461,571 A | | 10/1995 | Tran |
| 5,508,928 A | | 4/1996 | Tran |
| 5,549,477 A | | 8/1996 | Tran |
| 5,574,458 A | | 11/1996 | Tran |
| 5,606,500 A | | 2/1997 | Tran |
| 5,646,623 A | | 7/1997 | Walters et al. |
| 6,049,302 A | | 4/2000 | Hinckley, Jr. |
| 6,400,306 B1 | | 6/2002 | Nohara et al. |
| 6,784,838 B2 | | 8/2004 | Howell |
| 6,933,877 B1 | * | 8/2005 | Halladay et al. .............. 342/14 |
| 7,248,203 B2 | * | 7/2007 | Gounalis ...................... 342/13 |
| 2005/0030222 A1 | | 2/2005 | Steudel |
| 2008/0111728 A1 | * | 5/2008 | Stevens ....................... 342/14 |

\* cited by examiner

*Primary Examiner*—John B Sotomayor
(74) *Attorney, Agent, or Firm*—John H. Pearson, Jr., Esq.; Walter F. Dawson, Esq.; Pearson & Pearson, LLP.

(57) ABSTRACT

A digital missile warning system comprising a distributed pulse doppler radar having a plurality of antennas, each being coupled to a transmit/receive (T/R) module located adjacent to the antenna, and parallel signal processing channels including an A/D converter, FFT processor and a range/velocity track file processor in each channel for each antenna resulting in enhanced detection range, reduced False Alarm Rate (FAR), faster response time, reduced size, weight and installation requirements, improved reliability and reduced acquisition and life cycle costs. An optional optical missile warning system can provide azimuth and elevation data to the track file processors which enables a three (3) dimensional track of a missile, with azimuth and elevation angles provided by the optical system and range, velocity and acceleration data provided by the pulse doppler radar. The combination of Pulse Doppler Radar MWS and the Optical MWS produces close to a zero False Alarm Rate (FAR). Further, means to extract a threat IR missiles' roll rate and its seeker spin rate and phase angle are provided.

12 Claims, 6 Drawing Sheets

AIRBORNE DISTRIBUTED PULSE DOPPLER RADAR MISSILE WARNING SYSTEM

BACKGROUND OF THE INVENTION

1. Field of the Invention

This invention relates generally to an Airborne Pulse Doppler Radar Missile Warning System and, in particular, to a distributed missile warning system having typically two to six antennas operating simultaneously and continuously with parallel transmit/receive modules, and parallel processing of the radar data to provide rapid detection and timely activation of counter-measures.

2. Description of Related Art

Conventional Airborne Pulse Doppler Radar Missile Warning Systems (MWS) use multiple, electrically small antennas to cover the required search volume. The antennas are electronically sequenced with a programmed dwell time. Centralized and common transmitter, receiver and signal processor elements are used to keep the costs affordable. The economic efficiency of this architecture made sense twenty-five years ago when these systems were developed and when the cost of these major components represented the major cost of the system. Limitations of this conventional architecture include lost duty factor and increased scan time for a specific antenna resulting from the need to sequentially service all antennas, compromises in the selection of pre and post detection integration times, and the necessity to run heavy, stiff and expensive low loss RF Cable to each antenna, a problem exacerbated on large aircraft. In addition, these systems did not contain high speed data processors to insure that a low false alarm rate could be maintained in operational environments.

U.S. Pat. No. 4,700,191, issued Oct. 13, 1987 to Dan Manor of Rehovot, Israel, discloses a radar warning receiver for detecting and analyzing radar signals comprising a plurality of channels, one for each RF head which receives an antenna signal from one of four antennas. Acquisition mode was performed on all four antennas simultaneously, but critical bearing analysis required a reconfiguration of the parallel channels of the receiver resulting in a faster system, but not fully parallel and not instantaneous in its coverage. Also, the parallel channels contain a significant amount of redundant, and low reliability, analog circuitry.

U.S. Patent Application Publication No. US2005/0030222, published Feb. 10, 2005, by inventor Fritz Steudel, discloses a method for determining the spin and precession rates for a spaceborne radar target following an exoatmospheric parabolic flight path. The range rate component due the parabolic flight path is calculated then subtracted from the actual target range rate estimate provided by the wideband band tracking radar. The residue signal is FFT'd and shows sinusoidal variations in range rate due to shifts in the target's range geoid. These shifts are caused by the composite spin and precession motions of the target. The present invention, in contrast, uses amplitude variations in the target signal strength to measure both the target missiles' seeker spin rate and the missile body roll stabilization rate. The total return from the missile is composed of three major backscattering components. First, a traveling-wave return travels to the end of the missile where it is reflected by the missile skin/air mismatched interface. It then travels back to the nose of the missile where it is re-radiated. The amplitude of this component is modulated by the number of wings that interrupt the surface wave path as the missile body rotates producing the second component. A third component is caused by the partially silvered mirror at the input to the missiles front-end seeker. This light modulator also modulates the amplitude of the missile's radar return as it spins. These latter two amplitude variations are measured by storing each potential target amplitude return for a quarter of a second, then FFT'ing the resulting waveform. When a target is declared after 0.25 seconds of tracking, the spin and roll rates for it are determined simultaneously using the FFT of the targets amplitude variations. This FFT also provides the phase of the spin, thus the actual look angle of the seeker's silvered input modulator. Knowledge of the phase angle greatly enhances the simplicity and effectiveness of a jamming IR light source. The difference between the prior art for a spaceborne target and the present Missile Warning System are major as described above.

U.S. Pat. No. 5,287,110, issued Feb. 15, 1994 to My Tran, and assigned to Honeywell, Inc., of Minneapolis, Minn., describes aircraft survivability equipment (ASE) software which correlates data received by various ASE subsystems including a pulsed radar jammer, continuous wave (CW) radar jammer and a missile approach detector to provide a comprehensive and coherent picture of the threat environment. The ASE controls a decoy dispenser. The refined direction of arrival (DOA) for a threat is taken from these three receivers. Aiding in the correlation process is the time of arrival (TOA) and/or the carrier frequency of the threat missiles ground based radar pulses, all of which are estimated by each of the RF receivers. Thus, ASE suite of passive sub systems utilizes redundant data from multiple sources to refine the average measurement for the overall suite of subsystems. The disadvantage of this approach is that there is redundant hardware in the suite of equipments which are making the same measurements of the threat environment. Clearly Mr. Tran's approach is not an optimum design configuration either in terms of acquisition, reliability, maintainability, logistical programming or training. Its primary purpose is to correlate the data from multiple sensors for the user. The DOA measurement refinement is a secondary consideration.

However, in the present invention's active system, identical and inexpensive digital and data processors are operated simultaneously and in parallel to improve the detection range of threats while minimizing the time necessary to react to a target. The overall system's reliability is also improved by using the distributed low power transmitters and the highly reliable and redundant modern digital components for data acquisition and processing.

In addition, in this approach an optional feature to synergistically integrate with a multiple quadrant optical system has been provided. Accurate missile track data from the optical system, azimuth and elevation angles not available from the radar can be combined with the range, velocity and acceleration data from the radar, thus producing a full three-dimensional (3-D) track file. The major advantage of the "3D" file is more accurate verification of the threat missile flight path, thus enabling achievement of an ultra low false alarm rate.

SUMMARY OF THE INVENTION

Accordingly, it is therefore an object of this invention to provide a distributed pulse Doppler missile warning system having two to six transmit/receive modules and antennas coupled to parallel processing channels to minimize losses and enhance detection range, and to promote faster response time at a minimum cost to the user.

It is another object of the invention to reduce the false alarm rate (FAR) by compiling a minimum of 0.25 seconds track file history for each target. Each potential target's range, velocity and acceleration history are validated, then declared only after successfully matching the flight profile of known threats stored in a library.

It is a further object of this invention to provide the means to combine data from this pulse doppler missile warning system with data from an optical missile warning system. The combination allows the user to develop a three dimensional track of a missile with azimuth and elevation angles provided by the optical MWS of either an IR or UV type, and with range, velocity and acceleration provided by this pulse doppler radar. Since the false alarm sources for the optical and radar systems are uncorrelated, and the combined data produces a 3 dimensional track, this combination provides an even more rigorous validation and thus an ultra low false alarm rate.

It is yet another object of this invention to provide storage, amplitude detection, and an additional FFT processor to determine the threat missiles' seeker spin rate, phase angle and missile body roll stabilization rate. These data provide additional metrics to identify the threat and a mechanism to optimally create an error signal in the missile using a simple pulsed IR light source as a jammer.

These and other objects are further accomplished by a missile warning radar system comprising a plurality of antennas, a plurality of transmit/receive modules each coupled to one of the plurality of antennas, a signal processor having a plurality of parallel A/D converters each coupled to one of a plurality of FFT processors, each of the A/D converters receives an intermediate frequency (IF) signal from one of the plurality of transmit/receive modules, a data processor having a plurality of range/velocity track files, each of the track files receives data from a corresponding one of the plurality of FFT processors, and a dispense controller for initiating jamming activity in response to target information received from the data processor. The missile warning system comprises a channelized master oscillator for providing system clock signals, a transmit signal, and a local oscillator RF signal to the T/R modules. Each of the FFT processors comprises an extended memory, aperture weighting functions, and FFT processor for examining an amplitude history of a target signal over a minimum of approximately 0.25 seconds missile flight time to determine spin and roll characteristics of the targets signal. The data from the plurality of range/velocity track files is compared to threat missile data from a threat library for separating real threats from false alarms. As an option, the data processor may receive azimuth and elevation data from an optical missile warning system to supplement the radar's range, velocity and acceleration data. This option enables the system to provide three dimensional tracks of the threats in lieu of the radar's two dimensional tracks. The system comprises means for detecting missile roll rates, seeker spin frequencies, and phase angle to optimize countermeasures for shoulder-fired IR threats. The system comprises a library of known missile parameters including velocity limits, acceleration, missile roll and seeker spin rates to compare with measured target parameters. The purpose of this comparison is to validate the alarm, optimize the countermeasure response and minimize the false alarm rate. The system comprises means for entering new threat data to the library over the life of the system.

The objects are further accomplished by a method for providing a missile warning radar system comprising the steps of providing a plurality of antennas, coupling each one of a plurality of transmit/receive modules to one of the plurality of antennas and to an RF transmit signal, providing a signal processor having a plurality of parallel A/D converters, each of the A/D converters being coupled to one of a plurality of FFT processors, each one of the parallel A/D converters receives an intermediate frequency (IF) signal from one of the plurality of transmit/receive modules, providing a data processor having a plurality of range/velocity track files coupled to the outputs of the plurality of FFT processors, each of the track files receives data from a corresponding one of the plurality of FFT processors, and initiating jamming activity with a dispense controller in response to target information received from the data processor. The step of providing a data processor comprises the step of the data processor receiving range and velocity data from the signal processor for determining a two dimensional track of a missile. In an alternative step, the method includes incorporating azimuth and elevation data from an optical system to expand the track to three dimensions. The method comprises the step of detecting missile roll rate, seeker spin frequency, and phase angle to optimize countermeasures for shoulder-fired IR threats. The method comprises the step of providing a library of known missile parameters including, velocity limits, acceleration, missile roll and seeker spin rates to compare with target parameters before validating an alarm for purpose of optimizing a countermeasure response and to reject false alarms.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1A:
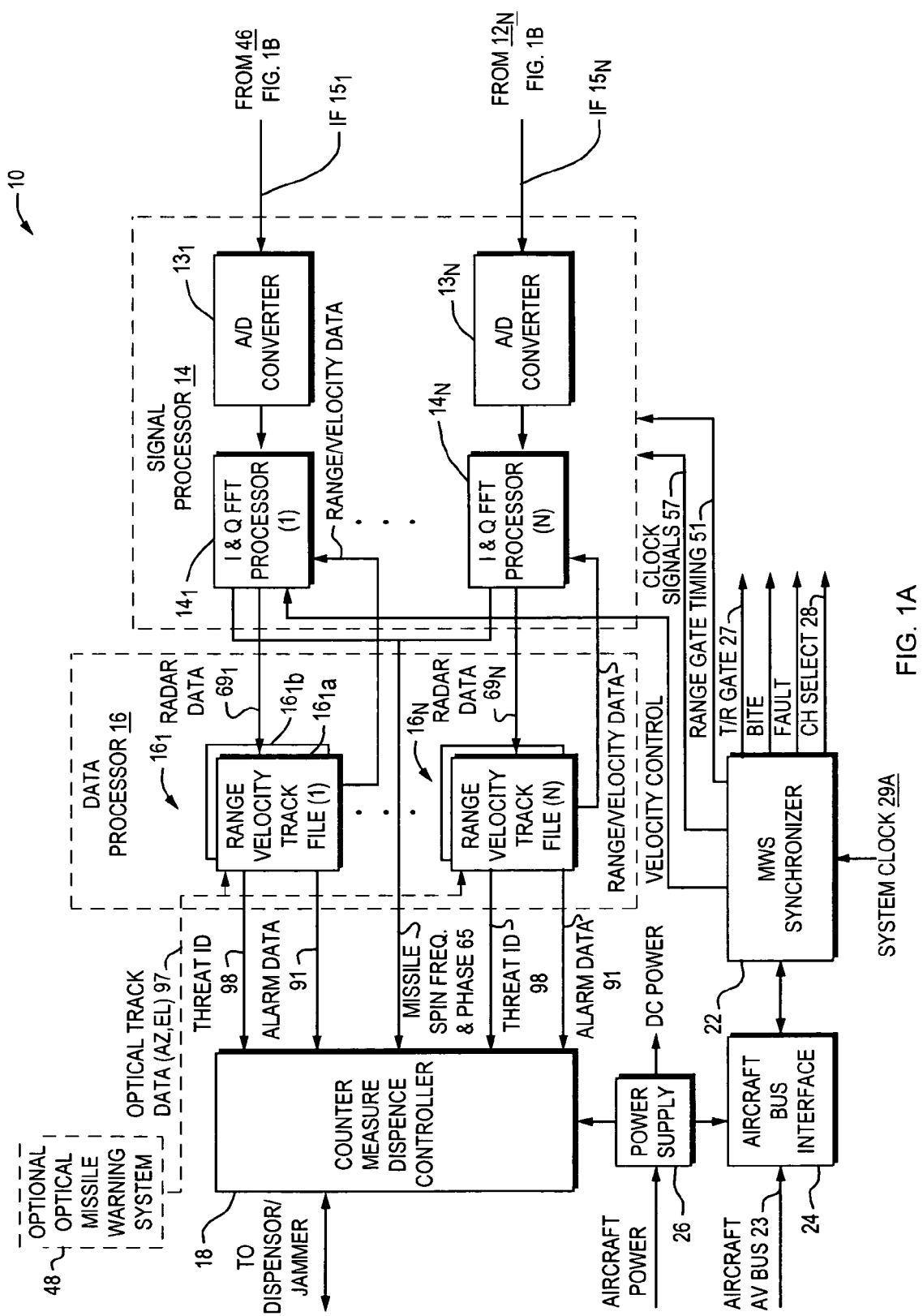
FIG. 1A and FIG. 1B together show a system block diagram of a distributed pulse doppler missile warning system according to the present invention.
Figures 1A, 1B:
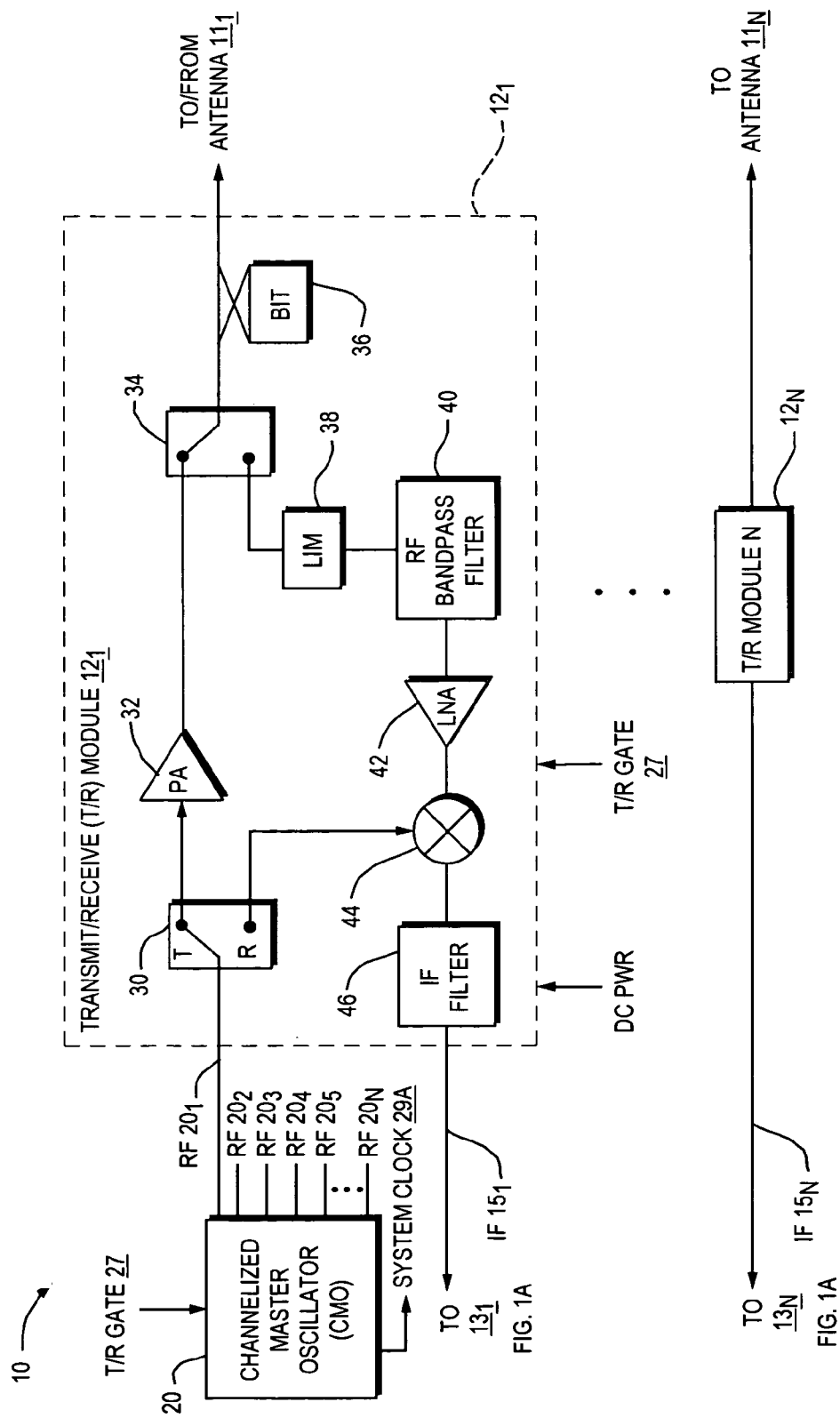

Referring to FIG. 1A and FIG. 1B, a block diagram is shown of a distributed pulse doppler missile warning system (DPDMWS) 10 according to the present invention. The DPDMWS 10 comprises a plurality of transmit/receive (T/R) modules $12_1$-$12_N$ each connected to one of a plurality of antennas $11_1$-$11_N$. A channelized master oscillator (CMO) 20 provides a system clock 29a and RF signals $20_1$-$20_N$ for each T/R module $12_1$-$12_N$. During transmit, the RF signals $20_1$-$20_N$ are the same transmitted carrier frequency, and all transmissions occur at the same time. During receive, the CMO offsets the RF signal by the IF. An analog IF signal $15_1$-$15_N$ from each T/R module $12_1$-$12_N$ is connected to a signal processor 14 and the signal processor 14 comprises a plurality of analog to digital (A/D) converters $13_1$-$13_N$ each one connected to one of a plurality of I&Q FFT Processors $14_1$-$14_N$ i.e. one for receiving each T/R module IF output signal $15_1$-$15_N$. The A/D converters $13_1$-$13_N$ are high speed with greater than 90 dB of spurious free dynamic range which permits fully parallel processing chains including clutter rejection for each IF signal $15_1$-$15_N$ from each antenna $11_1$-$11_N$.

Still referring to FIG. 1A and FIG. 1B, radar data outputs $69_1$-$69_N$ from the signal processor 14 are sent to a data processor 16 after determining the range and velocity of each detected signal which exceeds a preliminary threshold. The data processor 16 comprises a plurality of range/velocity track files $16_1$-$16_N$, one for each output from the I&Q FFT Processors $14_1$-$14_N$. The track file correlates approximately 12 preliminary detections using missile range, velocity and time data. When the data is consistent with an actual missile flight history stored in a library, a countermeasure alarm (alarm data 91) is generated along with target range, velocity and time-to-go (TTG) data which are sent to a countermeasure dispense controller 18 causing jammer devices to be activated. The parallel combination of the A/D converters $13_1$-$13_N$, FFT Processors $14_1$-$14_N$ and data processors $16_1$-$16_N$ allow the elimination of dead time loss suffered by each antenna of a prior art missile warning system where the system was forced to process the other antenna RF signals sequentially. With an ordinary four antenna scanning system this amounts to 6 dB penalty or a 25% duty factor loss. An additional 1 dB is saved in the present DPDMWS 10 by avoiding the 25% blanking required at each new antenna position due to the ringing of a clutter filter in the prior art system. The ringing results from abruptly switching to a new clutter signal as the antennas were electronically scanned.

Still referring to FIG. 1A and FIG. 1B, each T/R module $12_1$-$12_N$, such as T/R module $12_1$, comprises a switch 30 which sends an RF $20_1$ signal to a power amplifier (PA) 32 and then to Duplexer switch 34 which sends the amplified RF signal to the antenna $11_1$. A target return signal is received from antenna $11_1$ at switch 34 and coupled to limiter (LIM) 38 and then to an RF bandpass filter 40 which selects the desired frequency band of the radar signal and sends it to a low noise amplifier (LNA) 42. The output of the LNA 42 is coupled to mixer 44, and the mixer 44 output passes through IF filter 46 isolating the intermediate frequency (IF) $15_1$ signal which is sent to the signal processor 14. The IF filter also rejects RF Image frequencies and potential aliasing_frequencies for the FFT process. The power amplifier 32 is designed to operate over a wide range of input RF power which allows the use of a single, small, flexible and relatively inexpensive RF cable back to the master oscillator 20 in the main assembly. By switching the RF signal between the carrier and local oscillator frequencies, only one RF cable is required for each T/R module. The resulting received lower frequency IF $15_1$-$15_N$ signal from each T/R module $12_1$-$12_N$ is conducted back to the signal processor 14 on inexpensive video cable. The T/R modules $12_1$-$12_N$ produce 3 dB transmit power savings and 2 dB noise figure improvement just by avoiding the loss of long RF cables.

The DPDMWS 10 comprises a power supply 26 which receives aircraft power and generates the power for the DPDMWS 10. An aircraft interface device 24 is provided to interface to the aircraft AV bus 23. A MWS Synchronizer 22 generates signals for use in the DPDMWS 10 including a T/R gate 27 signal, a Built-in-Test Equipment (BITE) signal, a FAULT signal, Range Gate Timing, Clock Distribution, and a channel select 28 signal. The number of antennas and parallel channels required depends on the total coverage required for the host aircraft. Large helicopters with limited maneuverability may require only two belly mounted antennas. Conversely highly maneuverable fighter bombers may require quadrant azimuthal coverage plus up and down antennas (six total) which are activated during roll maneuvers. The most common configuration is quadrant (4) antennas with each providing 90° in azimuthal and +25° to −65° in elevation coverage relative to the aircraft horizon.

The parallel processing architecture shown in FIGS. 1A and 1B permits the optimization of both the coherent and the non-coherent integration intervals instead of accepting compromised intervals imposed by a scanning antenna. The scanning antenna dwell and revisit times in prior art radar systems were dictated by the system reaction time to the worst case short range missile shot. Simultaneously the coherent dwell interval had to be wide enough to insure the worst case accelerating missile doesn't fly out of the filter bandwidth during the dwell time. This equated to a 3 to 5 dB integration loss for the scanning system that is avoided with the distributed parallel architecture of FIG. 1A and FIG. 1B. In addition the low cost and high speed of the digital signal processor 14 allows for implementing more efficient 50% overlapped Range Gates and Doppler Filters. This 50% overlapping reduces the worst case range gate/Doppler filter splitting losses of the older architecture from 3 dB to 1.5 dB for each operation providing a net improvement of 3 dB. These benefits more than make up for the typical 2.5 dB loss incurred by an FFT Aperture Weighting Function 56 (FIG. 2) of the DPDMWS 10. The weighting is necessary to achieve the required 90 dB rejection in the FFT filter shape to suppress ground clutter returns. In summary the benefits of parallel digital processing are as follows:

(a) 6 dB improved final bandwidth (sensitivity) for a 4 antenna embodiment;

(b) 3 to 5 dB sensitivity improvement by minimizing the Post Detection Integration Loss;

(c) 1 dB sensitivity improvement by elimination of a Clutter Switching Transient;

(d) 3 dB sensitivity improvement by providing 50% Overlapped Range Gates and Doppler Filters;

(e) −(2.5) dB loss incurred for Aperture Weighting the FFT; and (f) simultaneous adaptive velocity coverage for all antennas, adapted to host A/C ground speed.

It should be noted here that the overall performance improvement is the sum of that credited to the T/R modules $12_1$-$12_N$ and the parallel processing elements including the signal processor 14 and data processor 16.

The parallel nature of the DPDMWS 10 configuration achieves improved detection range and false alarm rate with a very high probability of detection (e.g. 99.9%), for each missile. These improvements are achieved despite lower cost, lighter weight and much greater reliability. Much of the reliability enhancement results from the use of lower power devices mounted near the antenna such as a transmitter. Only a single, small size, low-cost RF cable is required for each antenna.

Figure 2:
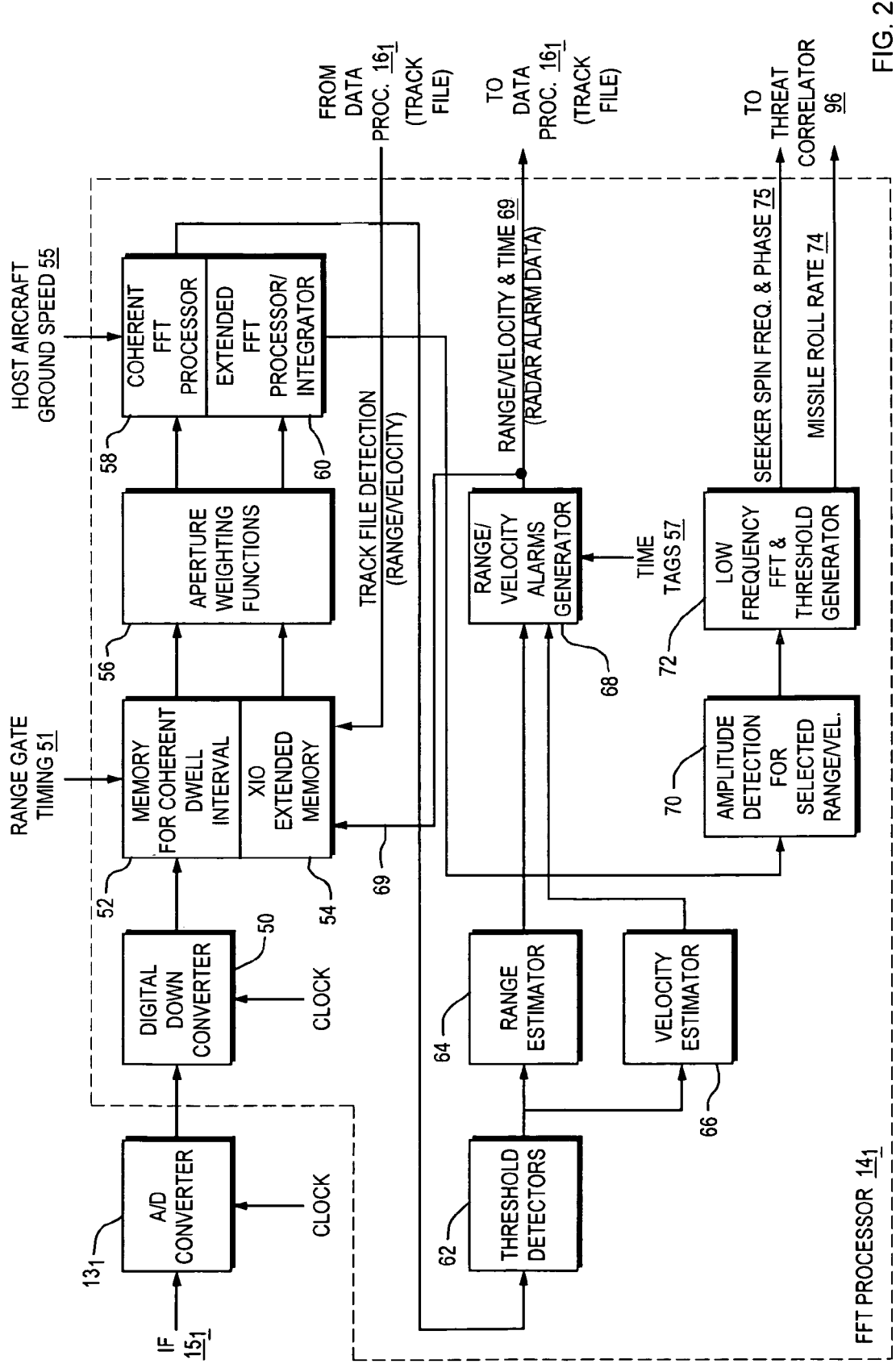
FIG. 2 is a functional block diagram of an FFT Processor of FIG. 1A.

Referring now to FIG. 2, a functional block diagram is shown of one of the FFT Processors $14_1$. An A/D converter $13_1$ receives the IF Signal $15_1$ from T/R module $12_1$, and converts it to a digital word of 16 bits with 90 dB spur free dynamic range (SFDR) for processing by the FFT Processor $14_1$. The digital word is received by a digital down converter 50 which converts the digitized IF signal to baseband.

The output of the digital down converter 50 is sent to a memory 52 for coherent dwell interval which is approximately 25 milliseconds long based on the RF Carrier Frequency used and the worst case missile acceleration specified. Memory 52 receives range gate timing signals 51 to sort the return signal by range gate. An extended memory 54 is provided to store additional target signal data at the range and velocity where each preliminary alarm has been detected 69. Aperture weighting functions 56 are applied to the data received from the memory 52 to ensure 90 db of selectivity for all FFT filter functions 58.

The host aircraft ground speed inhibits processing filters which contain ground clutter. The output of the coherent FFT Processor 58 is coupled to threshold detectors 62 which determine that the target return signal is above a predetermined threshold of approximately +9 db. The signals are then sequentially sent to a Range Estimator 64 and a Velocity Estimator 66. This target data is combined in the range velocity alarms generator 68 before being sent to the track file $16_1$. The range 69 portion of the target data along with the time tag is used to initialize the extended memory 54 which gathers additional data for analysis of the missiles' spin data. An Extended FFT Processor/Integrator 60 is located with the coherent FFT Processor 58. The Extended FFT Processor 60 receives digitized range data from the Extended Memory 54 via the aperture weighting function. The range and velocity data $16_1$ from the track file is used to ensure the Extended FFT processor 60 integrates the detected target signal amplitudes in the appropriate range and velocity bins. The output of the Extended FFT Processor/Integrator 60 is coupled to an amplitude detector 70 for the selected range/velocity of the target missile.

The Amplitude Detector 70, after detection of the alarming signals amplitude history, sends the data to the low frequency FFT 72 which includes a threshold detector to generate Seeker Spin Frequency and phase 75 and Missile Roll Rate 74 for threat correlation and to optimize the activation of flares or other IR countermeasures used to confuse the target missile.

This important benefit provided by the FFT Processor $14_1$-$14_N$ is of an operational nature. The front ends of all widely distributed IR Missile Seekers use a rotating, half silvered mirror to modulate the IR source being tracked by the target missile. When the source is centered in the seeker's field of view, the rotating mirror provides a constant amplitude IR signal to the missile's narrow-band tracking loop. When the seeker is not pointed exactly at the target source, the IR amplitude is modulated at the rate of the mirror's rotation. The relative phase of the modulation defines the direction of the angular error. The rotation of the mirror also modulates the amplitude of the missile's radar return. Knowing this rotation rate and phase angle accurately allows a jammer to blink precisely at the correct time to get fully into the missile's narrow track loop band-width and to generate an error signal in a constant direction to drive the missile away from its intended target.

Figure 4A:
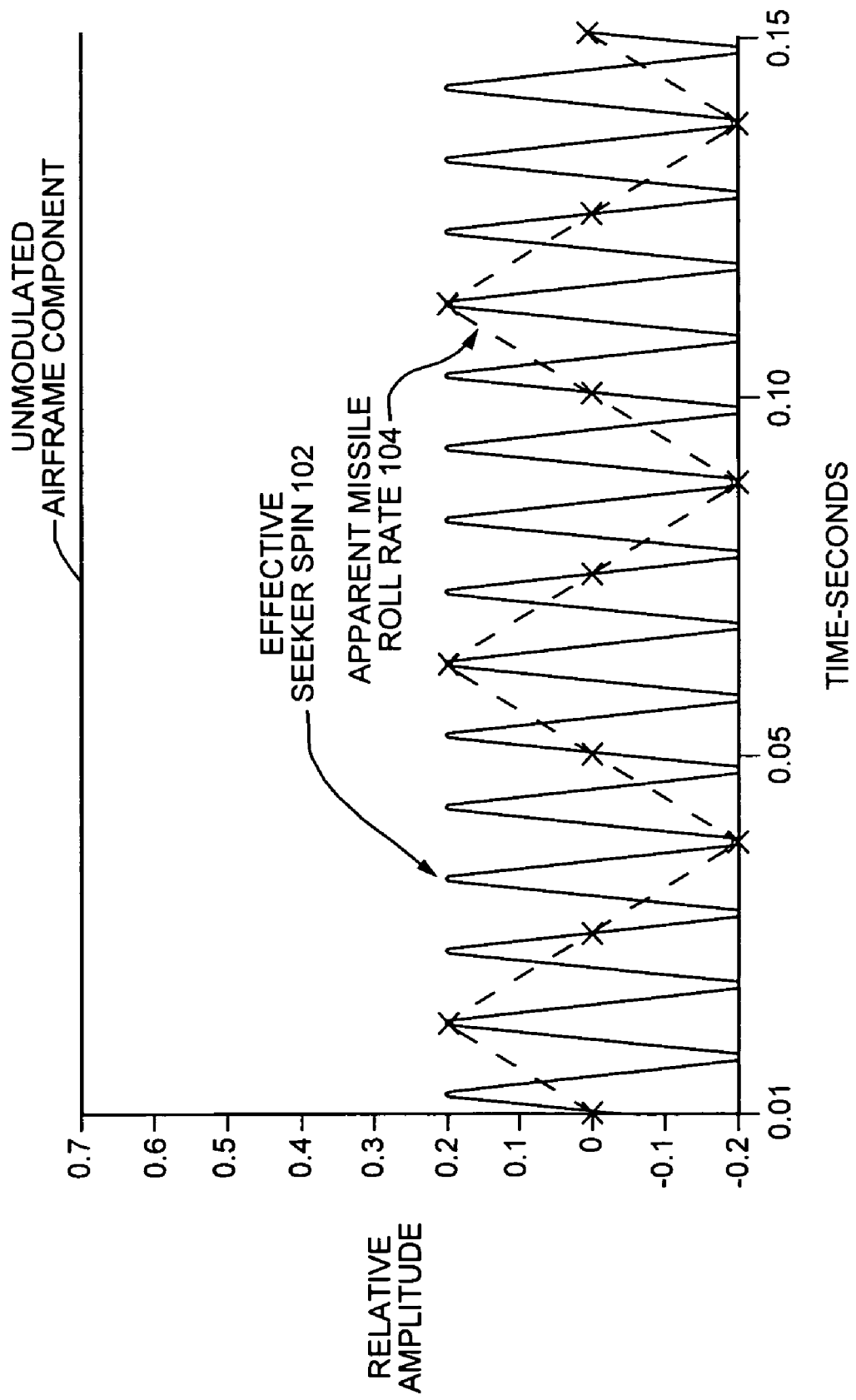
FIG. 4A is a plot of the amplitudes of the three major components of the missiles return showing the seeker spin and missile roll rate.
Figure 4B:
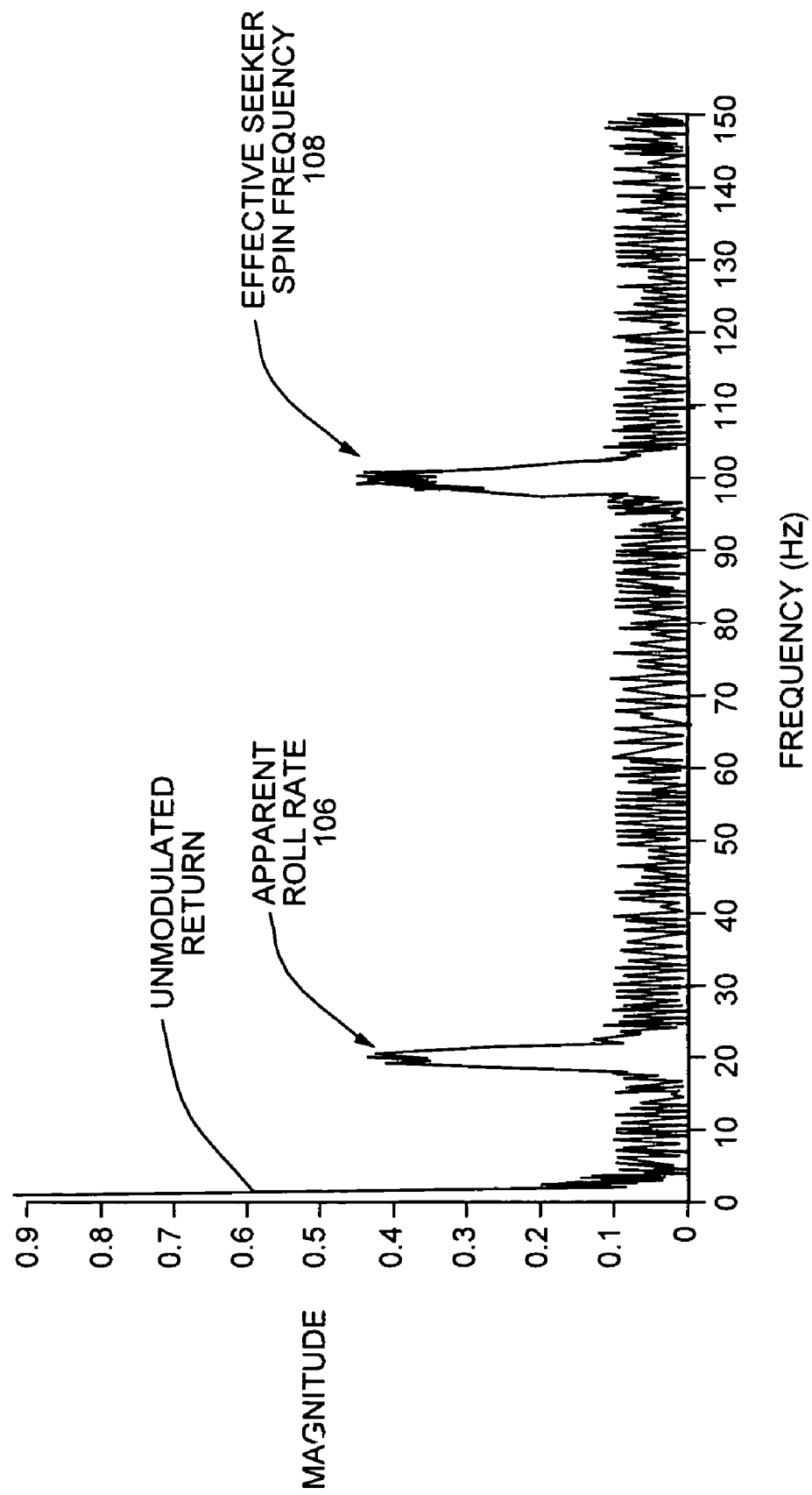
FIG. 4B is a plot of the FFT output of the amplitude detector processing the three major components of FIG. 4A showing the missiles' roll rate and the seeker spin frequency.

Referring to FIG. 4A and FIG. 4B, FIG. 4A is a plot of the detected missile's return signal amplitude components as a function of time after missile detection showing the unmodulated (DC) component along with the seeker spin 102 and missile roll rate 104. FIG. 4B is a plot of the FFT outputs of the amplitude detector processing the three major components of FIG. 4A and shows the missiles' roll rate 106 and the seeker spin frequency 108. The FFT Processor 14 also provides the relative phase angle of the seeker spin modulator to aid in optimizing a jamming signal.

When a target missile has been declared, the signal for that range gate and doppler frequency can be amplitude detected, then FFT'd again to measure the actual effective spin rate of the seeker's front end and the roll rate of the missile itself. Effective jamming at this precise spin frequency may be achieved by merely modifying an existing strobe light on the host aircraft. The modification would insure that the IR spectra and switching speed of the strobe light are adequate to jam the missile. Implementing this alternative jamming method may preclude the need for a dispensing mechanism or an expensive IR tracker/jammer. In the event there are two simultaneous missiles in flight, when they are resolved in range or doppler by the radar, both signals will be detected and separate FFT's will be performed to measure both spin frequencies and phase angles. A jammer will then spend 50% of the time at each spin frequency, insuring both missiles are jammed. In the rare circumstance, when both missiles are unresolved by the radar, the FFT on their combined signal will resolve the two spin frequencies and the jammer will again alternately switch between them. In an even more rare circumstance, when unresolved in spin frequency, a single jam frequency will be effective for both missiles, when deployed at the median phase angle determined by the FFT.

Figure 3:
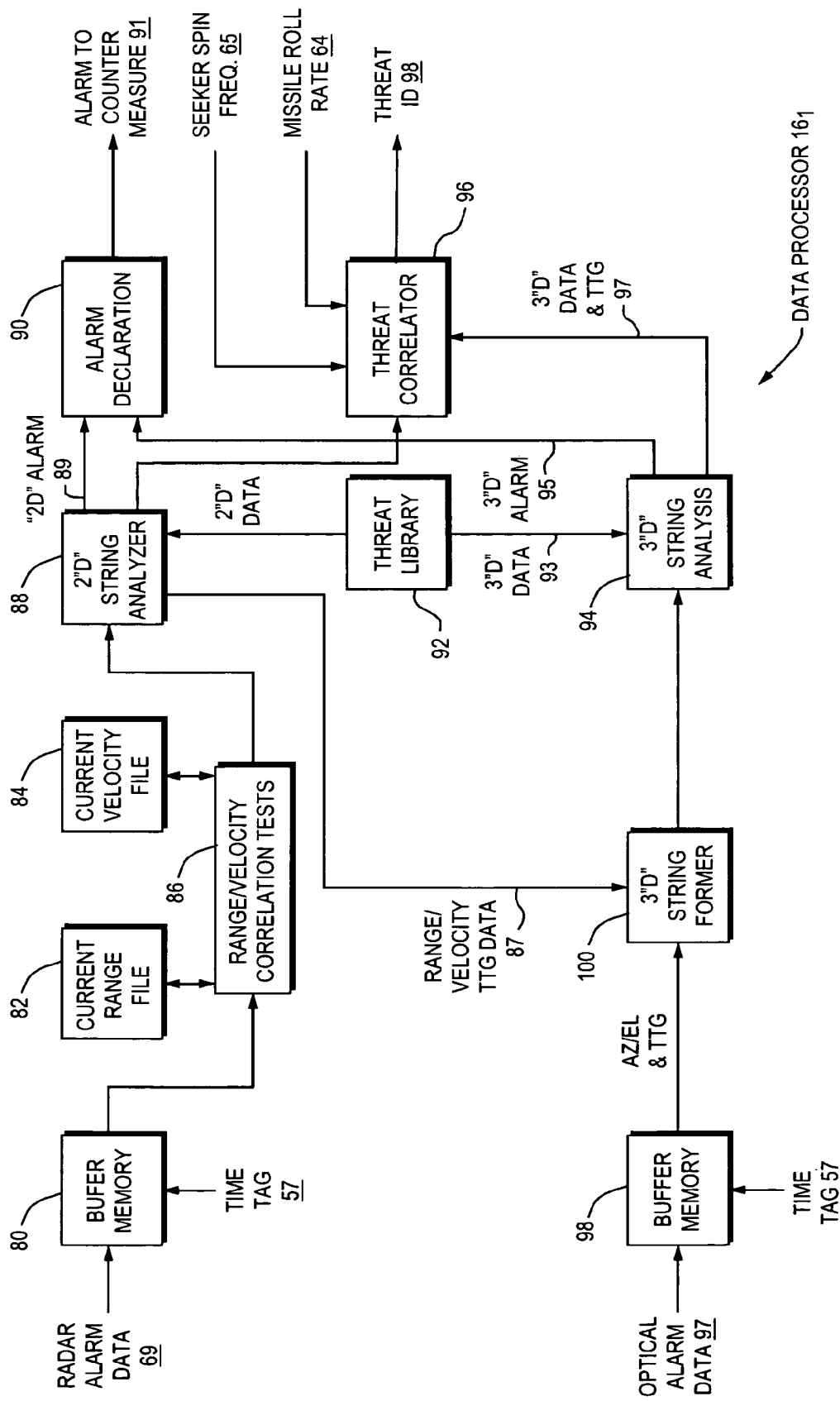
FIG. 3 is a functional block diagram of a range velocity track file of FIG. 1A.

Referring to FIG. 3, a functional block diagram is shown of the data processor track file $16_1$. Radar data 69 in the form of an estimated range and velocity are received and stored in the buffer memory 80, which also receives time tag signals 57 from the MWS synchronizer 22 (FIG. 1A). Range/velocity correlation tests 86 are performed on the new radar alarm data 69 stored in the buffer memory 80. Range data is stored in a current range file 82 and velocity data is stored in a current velocity file 84. A two-dimensional (2D) string analyzer 88 (string refers to string of target alarms) performs an analysis on the range/velocity data after the range/velocity correlation tests 86 and is compared to range/velocity data information from a threat library 92 which contains range/velocity profile boundaries for all threat missiles. If a 2D alarm signal 89 is generated, an alarm declaration 90 occurs sending the alarm data 91 (Range, time-to-go), threat ID, and time tag to the countermeasure dispense controller 18.

Still referring to FIG. 3, optional optical alarm data 97 from an optical missile warning system 48 (shown in FIG. 1A) would be received in another buffer memory 98 which also receives time tag signals 57. The optical alarm data 97 includes azimuth (AZ) angle, elevation (EL) angle, and a coarse time-to-go estimate. This data is sent to a three-dimensional (3D) string former 100. The 3D string former 100 also receives range/velocity and time-to-go (TTG) data 87 from the 2D radar string analyzer 88. The output from the 3D string former 100 is compared to the 3D string data from a threat library 92 which contains valid three-dimensional track data boundaries for each threat missile. If a 3D alarm signal 95 is consistent with a threat, it is sent to the alarm declaration 90 which provides an alarm signal 91 to the countermeasure dispense controller 18 (FIG. 1A). 3D and TTG data 97 from the 3D string analyzer 94 are sent to a threat correlator 96 which also receives the seeker spin frequency 65 and missile roll rate 64 from the FFT Processor 14 and generates a threat ID 98 signal which goes to the countermeasure dispense controller 18 as part of the "Alarm Data".

Referring again to FIG. 1A, the major improvements for the DPDMWS 10 are derived from the implementation of parallel track files $16_1$-$16_N$ maintained for each antenna $11_1$-$11_N$ by the high speed data processors 16. (One of these parallel Track Files is shown in FIG. 3). The track file process is similar to an "M" out of "N" integrator but differs in a beneficial way. The threshold at the output of the coherent FFT processor 14 is set relatively low to produce a high probability of detection (Pd) and a higher than normal false alarm rate (FAR) into the track file $16_1$-$16_N$. The range and velocity of each "detection" are interpolated from the overlapped range gates and velocity filters before they are transferred to the track file 16₁-16ₙ. After twelve (12) repetitions of the coherent process, noise alarms would create a scatter plot in the range/velocity plane. Conversely, the returns from a real missile threat produce a 0.25 second plot of the missiles relative range/velocity. The slope of this plot is the real acceleration of the missile. These three terms range, velocity and acceleration and a missile library are used to calculate the Time-To-Go (TTG) for the missile. The plot is compared to a library of real missile shot range, velocity and acceleration profile boundaries before being classified as a real threat. For all except the short range shots that require an immediate response, the track file length is allowed to grow until the optimum time for jammer activation has occurred. This adaptive file length insures both a high Probability of Detection (Pd) and further improves the FAR for the DPDMWS 10 by providing more data points in the comparison to a valid flight profile.

In addition to identifying real threats, the track file 16₁-16ₙ provides a means to reject all known classes of false targets presented to the radar. An example is the pulse side-bands of another pulse doppler radar operating in the same or an adjacent RF band, but at a different pulse repetition frequency (PRF). The interference will be detected at some beat frequency between the two radars' PRF's. However the apparent range of this false target will constantly change across the complete range coverage because of the asynchronous nature of the two radars' PRF's. This rapid change in range will not correlate with possible threats and will terminate the alarm activity. Other potential sources of false alarms for the pulse doppler radar, e.g., fan jet engine blade modulation, helicopter blade returns and approaching high-speed aircraft all have unique range/doppler time signatures, which permits the data processor 16 to reject essentially all false alarms because of their invalid range/velocity profile while continuing to search for real threat missile profiles.

The track file 16₁-16ₙ also provides a mechanism to synergistically combine the tracks of the pulse doppler Radar MWS 10 with the tracks of an Optical MWS 48 of either an IR or UV type. The Optical MWS 48 has good to excellent angular accuracy but poor range and velocity estimates. They are subject to false IR and UV light sources which abound in urban and battlefield environments and are totally independent (stochastic) of the RF sources of Doppler Radar false alarms described above. Combining the two missile warning systems in the track file 16₁-16ₙ provides a three dimension track of a missile with azimuth (AZ) and elevation (EL) angles provided by the optical system and range and velocity/ acceleration by the radar system. This combination system has close to a zero False Alarm Rate and may be very valuable for specific applications like commercial airliners.

The efficient parallel architecture of this system also provides a highly reliable, low power system several thousand hour MTBF) with low costs for both the hardware and its installation on aircraft.

This invention has been disclosed in terms of a certain embodiment. It will be apparent that many modifications can be made to the disclosed apparatus without departing from the invention. Therefore, it is the intent of the appended claims to cover all such variations and modifications as come within the true spirit and scope of this invention.

What is claimed is:

1. A missile warning radar system comprising:
   a plurality of antennas;
   a plurality of transmit/receive modules each coupled to one of said plurality of antennas;
   a signal processor having a plurality of parallel A/D converters each coupled to one of a plurality of FFT processors, each of said A/D converters receives an intermediate frequency (IF) signal from one of said plurality of transmit/receive modules;
   a data processor having a plurality of range/velocity track files, each of said track files receives data from a corresponding one of said plurality of FFT processors; and
   a dispense controller for initiating jamming activity in response to target information received from said data processor.

2. The missile warning radar system as recited in claim 1 wherein said system comprises a channelized master oscillator for providing system clock signals, a transmit signal, and a local oscillator RF signal to said T/R modules.

3. The missile warning radar system as recited in claim 1 wherein each of said FFT processors comprises an extended memory, aperture weighting functions and FFT processor for examining an amplitude history of a target signal over a minimum of approximately 0.25 seconds missile flight time to determine spin and roll characteristics of said targets signal.

4. The missile warning radar system as recited in claim 1 wherein data from said plurality of range/velocity track files is compared to threat missile data from a threat library for separating real threats from false alarms.

5. The missile warning radar system as recited in claim 1 wherein said data processor receives azimuth and elevation data from an optical missile warning system and range, velocity and acceleration data from said signal processor for determining a three dimensional track of a missile.

6. The missile warning radar system as recited in claim 1 wherein said system comprises means for detecting missile roll rates, seeker spin frequencies, and phase angle to optimize countermeasures for shoulder-fired IR threats.

7. The missile warning radar system as recited in claim 1 wherein said system comprises a library of known missile parameters including velocity limits, acceleration, missile roll and seeker spin rates to compare with measured target parameters before validating to an alarm for optimizing the countermeasure response and minimizing a false alarm rate.

8. The missile warning radar system as recited in claim 4 wherein said system comprises means for entering new threat data to said threat library for optimizing target recognitions and countermeasure responses over the life of said system.

9. A method for providing a missile warning radar system comprising the steps of:
   providing a plurality of antennas;
   coupling each one of a plurality of transmit/receive modules to one of said plurality of antennas and to an RF transmit signal;
   providing a signal processor having a plurality of parallel A/D converters, each of said A/D converters being coupled to one of a plurality of FFT processors, each one of said parallel A/D converters receives an intermediate frequency (IF) signal from one of said plurality of transmit/receive modules;
   providing a data processor having a plurality of range/ velocity track files coupled to the outputs of said plurality of FFT processors, each of said track files receives data from a corresponding one of said plurality of FFT processors; and
   initiating jamming activity with a dispense controller in response to target information received from said data processor.

10. The method as recited in claim 9 wherein said step of providing a data processor comprises the step of said data processor receiving azimuth and elevation data from an optical missile warning system and range and velocity data from said signal processor for determining a three dimensional track of a missile.

11. The method as recited in claim 9 wherein said method comprises the step of detecting missile roll rate, seeker spin frequency, and phase angle to optimize countermeasures for shoulder-fired IR threats.

12. The method as recited in claim 9 wherein said method comprises the step of providing a library of known missile parameters including, velocity limits, acceleration, missile roll and seeker spin rates to compare with target parameters before validating an alarm for purpose of optimizing a countermeasure response and measuring a false alarm rate.

* * * * *